United States Patent
Schweikart et al.

(10) Patent No.: US 7,384,472 B2
(45) Date of Patent: Jun. 10, 2008

(54) PIGMENT PREPARATIONS BASED ON PY 155

(75) Inventors: Karl-Heinz Schweikart, Eschborn (DE); Jean-Philippe Lerch, Rouffach (FR); Laurent Pourcheron, Dietwiller (FR)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 11/724,092

(22) Filed: Mar. 14, 2007

(65) Prior Publication Data

US 2007/0215008 A1   Sep. 20, 2007

(30) Foreign Application Priority Data

Mar. 14, 2006  (EP) .................. 06290428

(51) Int. Cl.
C09B 67/22 (2006.01)
C09B 67/20 (2006.01)
C09D 11/00 (2006.01)

(52) U.S. Cl. ............... 106/496; 106/31.78; 106/31.79; 106/31.8; 106/31.81; 106/493; 106/494; 47/57.6; 430/7; 430/105; 430/108.2; 430/108.21; 430/108.23; 524/106; 524/190

(58) Field of Classification Search ............ 106/31.78, 106/31.79, 31.8, 31.81, 493, 494, 496, 31.85; 47/57.6; 353/84; 430/7, 105, 108.2, 108.21, 430/108.23; 524/106, 190
See application file for complete search history.

(56) References Cited

U.S. PATENT DOCUMENTS

| 3,997,521 | A | * | 12/1976 | Forter et al. ............ 534/748 |
| 4,003,886 | A | * | 1/1977 | Muller .................... 534/575 |
| 4,461,647 | A | | 7/1984 | Schofield et al. |
| 6,117,606 | A | * | 9/2000 | Macholdt et al. ...... 430/108.23 |
| 7,115,164 | B2 | * | 10/2006 | Robertson et al. ......... 105/496 |
| 7,220,843 | B2 | | 5/2007 | Pflieger et al. |
| 2006/0286477 | A1 | | 12/2006 | Pflieger et al. |

FOREIGN PATENT DOCUMENTS

| DE | 2058849 | 6/1971 |
| DE | 10316402 | 10/2004 |
| EP | 0076024 | 4/1983 |
| EP | 0908789 | 4/1999 |
| EP | 1329774 | 7/2003 |
| GB | 2239254 | 6/1991 |
| GB | 2356634 A * | 5/2001 |
| GB | 2356866 A * | 6/2001 |
| JP | 61-241365 | 10/1986 |
| WO | WO 2004/029167 | 4/2004 |

OTHER PUBLICATIONS

Derwent-Acc-No: 2005-146308, abstract of Japanese Patent Specification No. JP2005-031163A (Feb. 2005).*
English Abstract of JP 2005031163, Feb. 3, 2005.
English Abstract of JP 2005338132, Dec. 8, 2005.
English Abstract of JP 61241365, Oct. 27, 1986.

* cited by examiner

Primary Examiner—Anthony J. Green
(74) Attorney, Agent, or Firm—Richard P. Silverman

(57) ABSTRACT

The invention concerns a pigment preparation based on C.I. Pigment Yellow 155, containing 0.1% to 50% by weight, based on the weight of C.I. Pigment Yellow 155, of at least one pigment dispersant from the group of monoazo or disazo pigments substituted with at least one sulfonic acid group, characterized in that it has a chroma C greater than 53 in the CIELAB system in a solventborne alkyd melamine varnish comprising a 6.7% by weight concentration of the pigment preparation, and/or in that it has a chroma C greater than 35 in the CIELAB system in an aqueous base varnish system in a white reduction comprising a 0.2% by weight concentration of the pigment preparation in white reduction.

19 Claims, No Drawings

PIGMENT PREPARATIONS BASED ON PY 155

The present invention is described in the European priority application No. 06290428.9, filed 14 Mar. 2006, which is hereby incorporated by reference as is fully disclosed herein.

The present invention concerns a novel, improved pigment preparation based on C.I. Pigment Yellow 155 (hereinafter referred to as PY 155), a process for its production and its use, in particular in ink jet printing.

Pigment preparations are combinations of base pigments and so-called pigment dispersants, i.e., pigments substituted with groups having specific activity. Pigment dispersants are added to pigments in order to facilitate dispersion in application media, in particular in coatings and printing inks, and to enhance the rheological and coloristic properties of the pigments.

Pigments used for coloring macromolecular organic materials have to meet high performance requirements, such as high color strengths, easy dispersibility, high chroma and cleanness of hue and good light- and weatherfastness. Universal utility for coloring various macromolecular systems such as for example printing inks, coatings or plastics is desired as an ideal, and for example in the case of coatings or printing inks not only with regard to solvent-containing systems but also aqueous systems. With both coatings and printing inks there is a trend toward high pigment concentrations in the grind, which is why highly pigmented coating and printing ink concentrates or millbases with none the less low viscosity are demanded; similarly, the viscosity of the final coating or printing ink has to be right for the planned use. Printing inks are desired to have a high transparency, coating systems are desired to have impeccable overcoating fastnesses and solventfastnesses, resistance to alkali and acid and in the case of metallic effect coatings in particular high transparency and brilliant hues. In the case of plastics coloration, high bleed fastness, heat stability and good dispersibility are required, as is reflected in high color strengths for example. Universal utility in various systems, for example in aqueous and solvent-containing systems, is also desired as an ideal.

Further fields of use for pigments include for example electrophotographic toners and developers, liquid inks such as for example ink jet inks or e-inks, color filters, or powder coatings, which all have their additional specific requirements.

Ink jet printing is a contactless printing process wherein droplets of the recording fluid are directed from one or more nozzles onto the substrate to be printed. To obtain prints of excellent quality, the recording fluids and the colorants they contain have to meet high requirements including in particular with regard to the desired hue and reliability during the printing process.

As well as dye-based liquid inks there is an increasing tendency to use pigmented liquid inks in ink jet printing. A fine state of division on the part of the pigments contained in the liquid inks is a fundamental prerequisite for their use in ink jet printing, first to prevent cloggage of the nozzles, but secondly also to achieve a high transparency and a desired, for example greenish, hue.

The use of a disazo pigment of the formula (I) in ink jet inks is known and described for example in EP-A-0 908 789. The pigment having the structure according to formula (I) is commercially available under the designation C.I. Pigment Yellow 155.

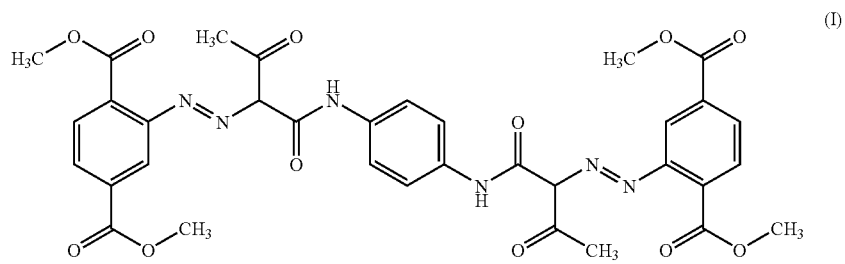

The formula (I) must be understood as an idealized representation. Disazo pigments of the formula (I) can also exist, partially or completely, in another tautomeric and/or cis/trans-isomeric form.

Processes for preparing a disazo pigment of the formula (I) by coupling diazotized dimethyl 2-aminoterephthalate with 1,4-bis(acetoacetylamino)benzene are disclosed for example in U.S. Pat. No. 3,997,521 (Example 20) and in DE-A-20 58 849 (Example 72).

The products obtained, hereinafter referred to as crude pigments, however, are usually of poor crystal quality, are agglomerated and do not have the desired performance characteristics. To obtain optimum utility, an aftertreatment, generally referred to as a finish, is often carried out, for example in solvents with or without surface-active agents.

GB-A-2 239 254 discloses a process wherein the crude pigment having the structure according to formula (I) is heated in dimethylformamide after synthesis.

U.S. Pat. No. 4,003,886 describes a process wherein as-synthesized disazo pigments are subjected to a finish with o-dichlorobenzene at a temperature of 130 to 135° C.

JP-1 241 365 proposes finishing a crude pigment, in particular an azo, quinacridone or dioxazine pigment, in a mixture of water and organic solvent at lower temperature (<100° C.) and alkaline pH in the presence of a surface-active additive, in particular a polyoxyethylene alkyl ether.

Combinations of the disazo pigment of the formula (I) and sulfo-containing monoazo and disazo pigment derivatives are known. GB-A-2 356 634 and GB-A-2 356 866 disclose carboxyl/sulfo-substituted monoazo and disazo compounds and their use together with C.I. Pigment Yellow 155 in pigment and liquid ink compositions. The monoazo and disazo compounds are added to the C.I. Pigment Yellow 155 in the form of their aqueous solutions during a dispersing step to produce a pigment formulation. The resulting average particle sizes for the corresponding pigment dispersions and ink jet inks (>160 nm) do not correspond to the small particle sizes of <100 nm preferred for ink jet applications.

The performance characteristics of PY 155 no longer meet the above-described requirements in all respects, in particular with regard to fineness and transparency in various application media.

EP-A-0 076 024 discloses disazo compounds used for liquefying pigment dispersions in nonaqueous systems.

WO-2004/029167 A1 discloses pigment preparations containing compounds disclosed in EP-A-0 076 024.

There is a need for a disazo pigment which overcomes the disadvantages of the known disazo pigments and meets the above requirements in the various application media. More particularly, there is a need for a PY 155 of higher chroma and better fineness, in particular for ink jet applications.

We have found that this object is achieved, surprisingly, by the pigment preparation described hereinbelow.

The present invention accordingly provides a pigment preparation based on C.I. Pigment Yellow 155, containing 0.1% to 50% by weight, preferably 0.5% to 20% by weight, more preferably 1% to 10% by weight and especially 1% to 5% by weight, based on the weight of C.I. Pigment Yellow 155, of at least one pigment dispersant from the group of monoazo or disazo pigments substituted with at least one sulfonic acid group, characterized in that it has a chroma C greater than 53, preferably greater than 55 and more preferably greater than 57 in the CIELAB system in a solvent-borne alkyd melamine resin varnish comprising a 6.7% by weight concentration of the pigment preparation, and/or in that it has a chroma C greater than 35, preferably greater than 36 and more preferably greater than 37 in the CIELAB system in an aqueous base varnish system in a white reduction comprising a 0.2% by weight concentration of the pigment preparation in white reduction.

The present invention also provides a process for producing the pigment preparation according to the invention, which comprises heating a PY 155 crude pigment in a mixture of water and an organic solvent having a boiling point (at atmospheric pressure) of above 100° C., preferably an aromatic solvent, in particular o-dichlorobenzene, at an alkaline pH, in particular at a pH of not less than 9, and in the presence of 0.1% to 50% by weight, preferably 0.5% to 20% by weight, more preferably 1% to 10% by weight and especially 1% to 5% by weight, based on the weight of C.I. Pigment Yellow 155, of the pigment dispersant to a temperature of above 60° C. and preferably above 90° C.

The PY 155 crude pigment used is advantageously a disazo pigment of the formula (I) which may be prepared by known processes and may be present in amorphous form, in crystalline form or as a mixture of amorphous form and crystalline form. The crystalline form may in each case consist of a specific crystal phase or of a mixture of a plurality of crystal phases. It is also possible to use a mixture of different crude pigments of the formula (I).

If necessary, the as-synthesized crude pigment can be subjected to a customary fine division, for example by acid pasting, acid swelling, dry grinding or wet grinding.

The crude pigment can be used in dry form or as a press cake in finish, preferably it is used in dry form. Drying is effected according to known processes, for example by cabinet drying, belt drying, paddle wheel drying, tumble drying, contact drying, spin flash drying or spray drying.

The solvent system used for the present invention's finish consists of water, organic solvent and a sufficient amount of base to set an alkaline pH.

Useful organic solvents include in principle all organic solvents, and also mixtures thereof, that have a boiling point of above 100° C. and preferably above 110° C. Aromatic solvents will prove particularly suitable. They may be substituted by one or more halogen atoms, for example chlorine, bromine or iodine, nitro and/or $C_1$-$C_4$-alkyl. Substituted benzene such as for example chlorobenzene, dichlorobenzenes, trichlorobenzenes or bromobenzene is contemplated in particular. o-Dichlorobenzene will prove most suitable.

Preferred bases used for setting an alkaline pH are alkali metal and/or alkaline earth metal hydroxides, if appropriate in the form of their aqueous solutions, such as sodium hydroxide or potassium hydroxide. Nitrogenous bases are also conceivable, examples being ammonia or methylamine.

To achieve the desired effect, a pH of not less than 9.0 is advantageous, preferably pH of not less than 10 and in particular pH of not less than 10.5. It is customary to employ a pH of not less than 11.0. The base can also be used in large amounts of up to 20% by weight, preferably up to 15% by weight and especially up to 10% by weight, based on the amount of water.

The weight ratio of water to organic solvent is in the range from 5:95 to 95:5, preferably in the range from 7.5:92.5 to 92.5:7.5, especially in the range from 10:90 to 90:10 and more preferably in the range from 20:80 to 80:20.

The total amount of water and organic solvent is in the range from 0.5 to 40, preferably from 1 to 20 and especially from 2 to 15 parts by weight per part by weight of pigment.

The solvent system may be a one-phase system or a two-phase system. Preference is given to using such organic solvents as are not completely miscible with water, and the finish is preferably carried out in a two-phase solvent system comprising an aqueous phase and an organic phase.

The finish in accordance with the present invention can be carried out at a temperature of 60 to 250° C., preferably 90 to 200° C. and especially 100 to 190° C. and advantageously for a time of 5 minutes to 24 hours, particularly 5 minutes to 18 hours and especially 5 minutes to 12 hours. Preferably, the finish is carried out at boiling temperature, in particular at temperatures above the boiling point of the solvent system under superatmospheric pressure.

Pigment dispersants derived from monoazo pigments include for example those of the formula (II)

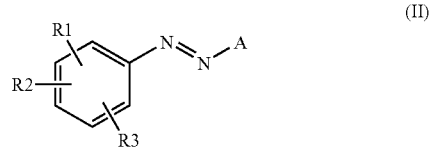

where A is a radical of the formula (III) or (IV)

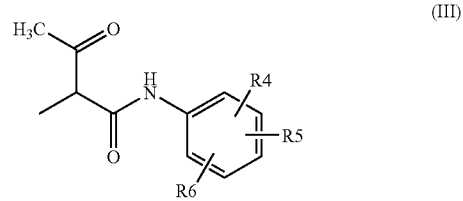

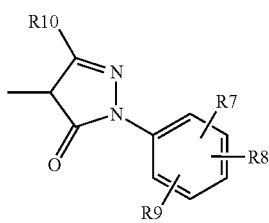

(IV)

and where

R1, R2, R3, R4, R5, R6, R7, R8 and R9 are independently H, halogen, for example F, Cl, Br or I, $SO_3M$, a substituted or unsubstituted, branched or unbranched $C_1$-$C_{10}$-alkyl or $C_3$-$C_{10}$-cycloalkyl radical or a substituted or unsubstituted, branched or unbranched $C_2$-$C_{10}$-alkenyl or $C_3$-$C_{10}$-cycloalkenyl radical, aryl, aryloxy, aryl($C_1$-$C_4$)alkyl, hetaryl, hetaryloxy, hetaryl($C_1$-$C_4$)alkyl or $C_3$-$C_{10}$-alkoxy, R10 is H, COOM, COO($C_1$-$C_{10}$)alkyl, a substituted or unsubstituted, branched or unbranched $C_1$-$C_{10}$-alkyl or $C_3$-$C_{10}$-cycloalkyl radical, and M is H, a univalent metal cation, the equivalent of a multivalent cation, $NH_4^+$, a secondary, tertiary or quaternary ammonium ion, with the proviso that at least one of the two phenyl rings is substituted with at least one sulfonic acid group.

"Aryl" is here and also in the definitions below an aromatic radical, which preferably contains 6 to 15 carbon atoms. Examples thereof are phenyl, naphthyl, anthryl and phenanthryl.

"Hetaryl" refers here and also in the definitions below to an aromatic radical which as well as 1 to 10 carbon atoms preferably contains 1, 2, 3 or 4 heteroatoms from the group consisting of O, N, S and P. Examples thereof are pyrrolyl, furyl, thiophenyl, indolyl, isoindolyl, indolizinyl, benzofuryl, benzothiophenyl, pyrazolyl, imidazolyl, oxazolyl, isoxazolyl, thiazolyl, isothiazolyl, triazolyl, tetrazolyl, pyridyl, quinolinyl, isoquinolinyl, pyridazinyl, pyrimidinyl, pyrazinyl and triazinyl.

A preferred embodiment of the present invention utilizes pigment dispersants of the formula (V)

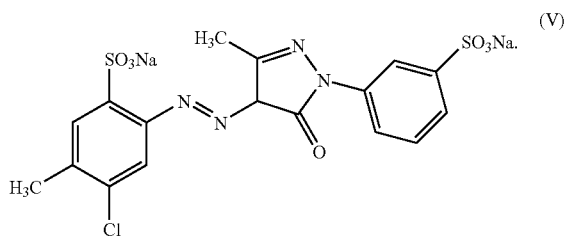

(V)

Pigment dispersants derived from disazo pigments are in particular those of the formula (VI)

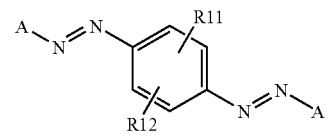

(VI)

where A is as described above and

R11 and R12 are independently

H, halogen, for example F, Cl, Br or I, a substituted or unsubstituted, branched or unbranched $C_1$-$C_{10}$-alkyl or $C_3$-$C_{10}$-cycloalkyl radical or a substituted or unsubstituted, branched or unbranched $C_2$-$C_{10}$-alkenyl or $C_3$-$C_{10}$-cycloalkenyl radical or $C_1$-$C_{10}$-alkoxy, and n is 1 or 2, preferably 2, with the proviso that at least one of the two terminal phenyl rings in the A radical is substituted with at least one sulfonic acid group.

The ammonium salt is preferably formed by a quaternary ammonium ion which has at least one linear saturated hydrocarbyl chain having more than 6 carbon atoms, in particular two linear saturated hydrocarbyl chains each of more than 12 carbon atoms, for example stearylbenzyl- or cocoalkyldimethylbenzylammonium or -2,4-dichlorobenzylammonium, hexadecyl-, stearyl-, dodecyl-, octadecyl- or cetyltrimethylammonium, dihydrogenated tallow fat alkyl-, dicocoalkyl-, dioctadecyl- or distearyidimethylammonium, oleyl- or cocodi(2-hydroxyethyl)methylammonium, hydrogenated polyoxyethylene(15)tallowmethylammonium, N,N,N',N',N'-pentamethyl-N-tallow-1,3-propanediammonium, permethylated N-stearyldiethylene-triamine, permethylated N-stearyltriethylenetetramine, N-(3-dodecyloxy-2-hydroxypropyl)octadecyldimethylammonium, methyltri(2-octyl) ammonium, N,N-di(betastearoylethyl)-N,N-dimethylammonium, laurylpyridinium, 2-hydroxy[5-chloro-, 5-isooctyl-, 5-t-butyl- or n-nonyl]1,3-xylylenebispyridinium, 2-methoxy-5-isooctyl-1,3-xylylenebispyridinium, 2-hydroxy-5-isooctyl-1,3-xylylenebisquinolinium, 2-hydroxy-5-isooctyl-1,3-xylylenebisisoquinolinium or behenyltrimethylammonium.

Pigment dispersants derived from disazo pigments are known and described for example in U.S. Pat. No. 4,461,647.

Particular preference is given to pigment dispersants of formula (VII)

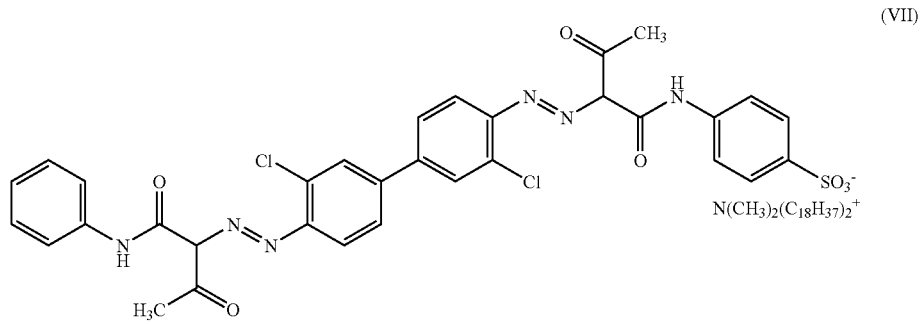

(VII)

The pigment preparations produced by the process of the present invention can be isolated using customary methods, for example by filtration, decanting or centrifugation. Preference is given to filtration or steam distillation. Solvents can also be removed by washing. The pigment preparations of the present invention can be utilized as preferably aqueous press cakes, but in general comprise dried, solid systems of free-flowing, pulverulent constitution, or comprise granules.

After the synthesis of the crude pigment, before or after the finish or else after drying, further auxiliaries can be added, examples being surfactants, pigmentary and nonpigmentary dispersants, fillers, standardizers, resins, waxes, defoamers, antistats, antidust agents, extenders, shading colorants, preservatives, drying retarders, rheology control additives, wetting agents, antioxidants, UV absorbers, light stabilizers, or a combination thereof.

Useful surfactants include anionic or anion-active, cationic or cation-active and nonionic or amphoteric substances or mixtures of these agents.

Useful anion-active substances include for example fatty acid taurides, fatty acid N-methyltaurides, fatty acid isethionates, alkylphenylsulfonates, for example dodecylbenzenesulfonic acid, alkylnaphthalenesulfonates, alkylphenol polyglycol ether sulfates, fatty alcohol polyglycol ether sulfates, fatty acid amide polyglycol ether sulfates, alkyl sulfosuccinamates, alkenylsuccinic monoesters, fatty alcohol polyglycol ether sulfosuccinates, alkanesulfonates, fatty acid glutamates, alkyl sulfosuccinates, fatty acid sarcosides; fatty acids, for example palmitic acid, stearic acid and oleic acid; the salts of these anionic substances and soaps, for example alkali metal salts of fatty acids, naphthenic acids and resin acids, for example abietic acid, alkali-soluble resins, for example rosin-modified maleate resins and condensation products based on cyanuric chloride, taurine, N,N'-diethylaminopropylamine and p-phenylenediamine. Preference is given to resin soaps, i.e., alkali metal salts of resin acids.

Useful cation-active substances include for example quaternary ammonium salts, fatty amine oxalkylates, polyoxyalkyleneamines, oxalkylated polyamines, fatty amine polyglycol ethers, primary, secondary or tertiary amines, for example alkyl-, cycloalkyl or cyclized alkylamines, in particular fatty amines, di- and polyamines derived from fatty amines or fatty alcohols and oxalkylates of the di- and polyamines, fatty acid derived imidazolines, polyaminoamido or polyamino compounds or resins having an amine index between 100 and 800 mg of KOH per g of polyaminoamido or polyamino compound, and salts of these cation-active substances, for example acetates or chlorides.

Useful nonionogenic and amphoteric substances include for example fatty amine carboxyglycinates, amine oxides, fatty alcohol polyglycol ethers, fatty acid polyglycol esters, betaines, such as fatty acid amide N-propylbetaines, phosphoric esters of aliphatic and aromatic alcohols, fatty alcohols or fatty alcohol polyglycol ethers, fatty acid amide ethoxylates, fatty alcohol-alkylene oxide adducts and alkylphenol polyglycol ethers.

Nonpigmentary dispersants refers to substances which are structurally not derived from organic pigments. They are added as dispersants either in the course of the production of pigments, but often also during the incorporation of the pigments in the application media to be colored, for example in the course of the production of coatings or printing inks by dispersion of the pigments in the corresponding binders. They may be polymeric substances, examples being polyolefins, polyesters, polyethers, polyamides, polyimines, polyacrylates, polyisocyanates, block copolymers thereof, copolymers of the corresponding monomers or polymers of one class which are modified with few monomers of another class. These polymeric substances bear polar anchor groups such as for example hydroxyl, amino, imino and ammonium groups, carboxylic acid and carboxylate groups, sulfonic acid and sulfonate groups or phosphonic acid and phosphonate groups, and may also be modified with aromatic, nonpigmentary substances. Nonpigmentary dispersants may further also be aromatic substances chemically modified with functional groups and not derived from organic pigments. Such nonpigmentary dispersants are known to one skilled in the art and are in some instances commercially available (examples being Solsperse®, Avecia; Disperbyk®, Byk-Chemie, Efka®, Efka, SMA®, Sartomer). Some types will now be mentioned illustratively, but in principle other substances described can also be used, examples being condensation products of isocyanates and alcohols, di- or polyols, amino alcohols or di- or polyamines, polymers of hydroxy carboxylic acids, copolymers of olefin monomers or vinyl monomers and ethylenically unsaturated carboxylic acids and esters, urethane-containing polymers of ethylenically unsaturated monomers, urethane-modified polyesters, condensation products based on cyanuric halides, nitroxyl-containing polymers, polyesteramides, modified polyamides, modified acrylic polymers, dispersants with a comb-like structure which are formed from polyesters and acrylic polymers, phosphoric esters, triazine-derived polymers, modified polyethers, or dispersants derived from aromatic, nonpigmentary substances. These foundational structures are frequently further modified, for example by chemical reaction with further substances bearing functional groups or by salt formation.

Fillers and extenders refers to a multiplicity of substances in accordance with DIN 55943 and DIN EN 971-1, for example the various types of talcum, kaolin, mica, dolomite, lime, barium sulfate or titanium dioxide.

The pigment preparations of the present invention are useful for pigmentation of macromolecular organic materials of natural or synthetic origin, for example plastics, resins, coatings, paints, electrophotographic toners and developers, electret materials, color filters and also liquid inks, printing inks and seed.

Macromolecular organic materials useful for pigmentation with the pigment preparations of the present invention include for example cellulose compounds, for example cellulose ethers and esters, such as ethylcellulose, nitrocellulose, cellulose acetates or cellulose butyrates, natural binders, for example fatty acids, fatty oils, resins and their transformation products, or synthetic resins, such as polycondensates, polyadducts, addition polymers and addition copolymers, for example amino resins, in particular urea- and melamine-formaldehyde resins, alkyd resins, acrylic resins, phenoplasts and phenolic resins, such as novolaks or resols, urea resins, polyvinyls, such as polyvinyl alcohols, polyvinyl acetals, polyvinyl acetates or polyvinyl ethers, polycarbonates, polyolefins, such as polystyrene, polyvinyl chloride, polyethylene or polypropylene, poly(meth)acrylates and their copolymers, such as polyacrylic esters or polyacrylonitriles, polyamides, polyesters, polyurethanes, cumarone-indene and hydrocarbon resins, epoxy resins, unsaturated synthetic resins (polyesters, acrylates) with the different curing mechanisms, waxes, aldehyde and ketone resins, gum, rubber and its derivatives and latices, casein, silicones and silicone resins; individually or in mixtures.

It is immaterial here whether the aforementioned macromolecular organic compounds are in the form of plastically deformable masses, melts or in the form of spinning solutions, dispersions, varnishes, paints or printing inks. Depending on the intended use, it will be advantageous to use the pigment preparations of the present invention as a blend or in the form of formulations or dispersions.

The present invention also provides a macromolecular organic material containing a coloristically effective amount of a pigment preparation according to the present invention.

Based on the macromolecular organic material to be pigmented, the pigment preparation of the present invention is usually used in an amount of 0.01% to 30% by weight and preferably 0.1% to 15% by weight.

The pigment preparations of the present invention are also useful as colorants in electrophotographic toners and developers, for example one- or two-component powder toners (also known as one- or two-component developers), magnetic toners, liquid toners, addition polymerization toners and also specialty toners. Typical toner binders are addition polymerization, polyaddition and polycondensation resins, such as styrene, styrene-acrylate, styrene-butadiene, acrylate, polyester, phenolic-epoxy resins, polysulfones, polyurethanes, individually or in combination, and also polyethylene and polypropylene, which may also contain further ingredients, such as charge control agents, waxes or flow assistants, or are subsequently modified with these additions.

The pigment preparations of the present invention are further useful as colorants in powders and powder coatings, in particular in triboelectrically or electrokinetically sprayable powder coatings used for surface coating articles composed for example of metal, wood, plastic, glass, ceramic, concrete, textile material, paper or rubber.

The pigment preparations of the present invention are also useful as colorants in ink jet inks on both an aqueous and a nonaqueous basis and also in liquid inks of the hot melt type.

In ink jet inks, the pigment preparations of the present invention can also be shaded with other colorants such as for example organic or inorganic pigments and/or dyes. In this case, they are used in ink sets consisting of yellow, magenta, cyan and black inks containing pigments and/or dyes as colorants. They can further be used in ink sets which additionally contain one or more "spot colors" in, for example, orange, green, blue, golden and silver.

Preference is given to a set of liquid printing inks whose black formulation preferably contains carbon black as colorant, in particular a gas or furnace black; whose cyan formulation preferably contains a pigment from the group of the phthalocyanine, indanthrone or triarylcarbonium pigments, in particular the Colour Index pigments Pigment Blue 15, Pigment Blue 15:1, Pigment Blue 15:2, Pigment Blue 15:3, Pigment Blue 15:4, Pigment Blue 16, Pigment Blue 56, Pigment Blue 60 or Pigment Blue 61; whose magenta formulation preferably contains a pigment from the group of the monoazo, disazo, β-naphthol, Naphthol AS, laked azo, metal complex, benzimidazolone, anthanthrone, anthraquinone, quinacridone, dioxazine, perylene, thioindigo, triarylcarbonium or diketopyrrolopyrrole pigments, in particular the Colour Index pigments Pigment Red 2, Pigment Red 3, Pigment Red 4, Pigment Red 5, Pigment Red 9, Pigment Red 12, Pigment Red 14, Pigment Red 38, Pigment Red 48:2, Pigment Red 48:3, Pigment Red 48:4, Pigment Red 53:1, Pigment Red 57:1, Pigment Red 112, Pigment Red 122, Pigment Red 144, Pigment Red 146, Pigment Red 147, Pigment Red 149, Pigment Red 168, Pigment Red 169, Pigment Red 170, Pigment Red 175, Pigment Red 176, Pigment Red 177, Pigment Red 179, Pigment Red 181, Pigment Red 184, Pigment Red 185, Pigment Red 187, Pigment Red 188, Pigment Red 207, Pigment Red 208, Pigment Red 209, Pigment Red 210, Pigment Red 214, Pigment Red 242, Pigment Red 247, Pigment Red 253, Pigment Red 254, Pigment Red 255, Pigment Red 256, Pigment Red 257, Pigment Red 262, Pigment Red 263, Pigment Red 264, Pigment Red 266, Pigment Red 269, Pigment Red 270, Pigment Red 272, Pigment Red 274, Pigment Violet 19, Pigment Violet 23 or Pigment Violet 32; whose yellow formulation preferably contains a pigment from the group of the monoazo, disazo, benzimidazoline, isoindolinone, isoindoline or perinone pigments, in particular the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 120, Pigment Yellow 126, Pigment Yellow 127, Pigment Yellow 128, Pigment Yellow 139, Pigment Yellow 151, Pigment Yellow 154, Pigment Yellow 155, Pigment Yellow 173, Pigment Yellow 174, Pigment Yellow 175, Pigment Yellow 176, Pigment Yellow 180, Pigment Yellow 181, Pigment Yellow 191, Pigment Yellow 194, Pigment Yellow 196, Pigment Yellow 213 or Pigment Yellow 219; whose orange formulation preferably contains a pigment from the group of the disazo, β-naphthol, Naphthol AS, benzimidazolone or perinone pigments, in particular the Colour Index pigments Pigment Orange 5, Pigment Orange 13, Pigment Orange 34, Pigment Orange 36, Pigment Orange 38, Pigment Orange 43, Pigment Orange 62, Pigment Orange 68, Pigment Orange 70, Pigment Orange 71, Pigment Orange 72, Pigment Orange 73, Pigment Orange 74 or Pigment Orange 81;

whose green formulation preferably contains a pigment from the group of the phthalocyanine pigments, in particular the Colour Index pigments Pigment Green 7 or Pigment Green 36.

The liquid ink sets can additionally contain shading dyes, preferably from the group C.I. Acid Yellow 17 and C.I. Acid Yellow 23; C.I. Direct Yellow 86, C.I. Direct Yellow 98 and C.I. Direct Yellow 132; C.I. Reactive Yellow 37; C.I. Pigment Yellow 17, C.I. Pigment Yellow 74, C.I. Pigment Yellow 83, C.O. Pigment Yellow 97, C.I. Pigment Yellow 120, C.I. Pigment Yellow 139, C.I. Pigment Yellow 151, C.I. Pigment Yellow 155 and C.I. Pigment Yellow 180; C.I. Direct Red 1, C.I. Direct Red 11, C.I. Direct Red 37, C.I. Direct Red 62, C.I. Direct Red 75, C.I. Direct Red 81, C.I. Direct Red 87, C.I. Direct Red 89, C.I. Direct Red 95 and C.I. Direct Red 227; C.I. Acid Red 1, C.I. Acid Red 8, C.I. Acid Red 80, C.I. Acid Red 81, C.I. Acid Red 82, C.I. Acid Red 87, C.I. Acid Red 94, C.I. Acid Red 115, C.I. Acid Red 131, C.I. Acid Red 144, C.I. Acid Red 152, C.I. Acid Red 154, C.I. Acid Red 186, C.I. Acid Red 245, C.I. Acid Red 249 and C.I. Acid Red 289; C.I. Reactive Red 21, C.I. Reactive Red 22, C.I. Reactive Red 23, C.I. Reactive Red 35, C.I. Reactive Red 63, C.I. Reactive Red 106, C.I. Reactive Red 107, C.I. Reactive Red 112, C.I. Reactive Red 113, C.I. Reactive Red 114, C.I. Reactive Red 126, C.I. Reactive Red 127, C.I. Reactive Red 128, C.I. Reactive Red 129, C.I. Reactive Red 130, C.I. Reactive Red 131, C.I. Reactive Red 137, C.I. Reactive Red 160, C.I. Reactive Red 161, C.I. Reactive Red 174, C.I. Reactive Red 180 and C.I. Reactive Red 241.

Ink jet inks generally contain in total 0.5% to 15% by weight and preferably 1.5% to 8% by weight (reckoned dry) of the pigment preparation of the present invention. Microemulsion inks are based on organic solvents, water and if appropriate an additional hydrotropic substance (compatibilizer). Microemulsion inks generally contain 0.5% to 15% by weight and preferably 1.5% to 8% by weight of the pigment preparation of the present invention, 5% to 99% by weight of water and 0.5% to 94.5% by weight of organic solvent and/or hydrotropic compound. Solvent based ink jet inks preferably contain 0.5% to 15% by weight of the pigment preparation of the present invention, 85% to 99.5% by weight of organic solvent and/or hydrotropic compounds.

Hot melt inks are usually based on waxes, fatty acids, fatty alcohols or sulfonamides that are solid at room temperature and become liquid on heating, the preferred melting range being between about 60° C. and about 140° C. Hot melt ink jet inks consist for example essentially of 20% to 90% by weight of wax and 1% to 10% by weight of the pigment preparation of the present invention. Hot melt ink jet inks may further contain 0% to 20% by weight of an additional polymer (as "dye dissolver"), 0% to 5% by weight of dispersing auxiliary, 0% to 20% by weight of viscosity modifier, 0% to 20% by weight of plasticizer, 0% to 10% by weight of tackifying additive, 0% to 10% by weight of transparency stabilizer (prevents crystallization of waxes for example) and also 0% to 2% by weight of antioxidant.

The pigment preparations of the present invention are further useful as colorants for color filters, not only for additive but also subtractive color generation, as for example in electro-optical systems such as television screens, liquid crystal displays (LCD's), charge coupled devices, plasma displays or electroluminescent displays, which in turn may be active (twisted nematic) or passive (supertwisted nematic) ferroelectric displays or light-emitting diodes, and also as colorants for electronic inks ("e-inks") or electronic paper ("e-paper").

To produce color filters, both reflective and transparent color filters, pigments are applied in the form of a paste or as pigmented photoresists in suitable binders (acrylates, acrylic esters, polyimides, polyvinyl alcohols, epoxides, polyesters, melamines, gelatin, caseins) to the respective LCD components (for example TFT-LCD=Thin Film Transistor Liquid Crystal Displays or for example ((S) TN-LCD= (Super) Twisted Nematic-LCD). As well as a high thermal stability, a stable paste or a pigmented photoresist also has a high pigment purity as a prerequisite. In addition, the pigmented color filters can also be applied by ink jet printing processes or other suitable printing processes.

The pigment preparations of the present invention are notable for their very good coloristic and rheological properties, in particular high flocculation stability, easy dispersibility, good rheology, high color strength, transparency and saturation (chroma). They are readily dispersible in many application media such as for example in solvent-containing or water-based coatings, to very fine states of subdivision. In ink jet applications, they provide a high color strength and transparency, a high luster when printing coated papers and also good storage stability combined with low viscosity for the ink jet ink, which does not give rise to cloggage of the nozzles.

In the examples which follow, percentages and parts are by weight, unless otherwise stated.

COMPARATIVE EXAMPLE 1

A disazo pigment of formula (I) was prepared as described in the example of GB-A-2 239 254 by coupling diazotized dimethyl 2-aminoterephthalate with 1,4-bis(acetoacetylamino)benzene and subsequent heating of the resulting crude pigment in dimethylformamide at 150° C. for 2 hours.

EXAMPLE 1

The crude pigment of the formula (I) is prepared as described in GB-A-2 239 254 by coupling diazotized dimethyl 2-aminoterephthalate with bis(acetoacetylamino)benzene, but without subsequent heating in dimethylformamide.

6.25 parts of styrene-maleic anhydride copolymer (SMA3000HNa® Sartomer) and 6.25 parts of pigment dispersant of formula (VII) are slurried up with 1350 parts of water. The mixture is stirred for several hours. Then, 38.4 parts of sodium hydroxide and 250 parts of the crude pigment are added and the mixture is stirred until a homogeneous slurry has formed. Subsequently, 150 parts of o-dichlorobenzene are added and the slurry is stirred under reflux for 1 hour. The pH is maintained above 10.5 throughout the entire finishing operation. Then, the solvent is removed from the mixture by steam distillation. After filtration, the press cake is washed pH neutral with deionized water, dried and then ground on a rotor mill.

EXAMPLE 2

Example 1 is repeated except that 2.5 parts of pigment dispersant of the formula (VII) and no SMA3000HNa® (Sartomer) are used.

EXAMPLE 3

Example 2 is repeated except that 12.5 parts of pigment dispersant of formula (VII) are used.

EXAMPLE 4

Example 2 is repeated except that 2.5 parts of pigment dispersant of the formula (V) are used instead of the pigment dispersant of the formula (VII).

EXAMPLE 5

Example 4 is repeated except that 12.5 parts of pigment dispersant of the formula (V) are used.

Testing of coloristic properties of pigment preparations in an alkyd-melamine baking finish:

An alkyd-melamine (AM) varnish was selected to assess the properties of the pigment preparation in water-free, solvent-based coating systems.

Determination of transparency:

To determine transparency, in each case 6 parts of the pigment preparation and 19 parts of a grind varnish are mixed and then dispersed. Thereafter, 50 parts of an alkyd-melamine letdown mix are introduced, homogenized and the resulting alkyd-melamine (AM) coating is drawn down on a test card.

The grind varnish used has the following composition:
50.0 parts of Vialkyd AC451n/70SNB (UCB Resins and Additives)
50.0 parts of Solvent Naphtha, 1e
100 parts of grind varnish The alkyd-melamine letdown mix has the following composition:
26.4 parts of Vialkyd AC451n/70SNB (UCB Resins and Additives)
29.4 parts of Vialkyd AC451/60SNA (UCB Resins and Additives)
35.8 parts of Maprenal MF600/55BIB (UCB Resins and Additives)
2.17 parts of n-butanol
2.17 parts of Depanol I
1.86 parts of butyldiglycol
2.2 parts of Solvent Naphtha, 1e
100 parts of alkyd-melamine letdown mix Transparency is subsequently assessed visually as follows:

| | |
|---|---|
| −VI | significantly more hiding |
| −V | substantially more hiding |
| −IV | distinctly more hiding |
| −III | markedly more hiding |
| −II | somewhat more hiding |
| −I | by a trace more hiding |
| /=/ | approximately equal to |
| +I | by a trace more transparent |
| +II | somewhat more transparent |
| +III | markedly more transparent |
| +IV | distinctly more transparent |
| +V | substantially more transparent |
| +VI | significantly more transparent |

The pigment of Comparative Example 1 was used as transparency standard.

Determination of color strength and of CIELAB values:

To determine color strength and CIELAB values, in each case 16 parts of the alkyd-melamine coating obtained above are homogenized with 3 parts of a white paint and drawn down on a test card. After baking at 140° C. for 20 minutes, the coloristic properties (color strength and CIELAB values L*, a*, b*, C and h) are determined using a CM-3700d spectrophotometer from Minolta.

The white paint has the following composition:

52.63 parts of white paste (Standox GmbH, Article 256013)
24.13 parts of Vialkyd AC451/60SNA (UCB Resins and Additives)
15.15 parts of Maprenal MF600/55BIB (UCB Resins and Additives)
0.7 part of BYK-331, 1% in Solvent Naphtha, 1e
0.7 part of butyldiglycol
1.4 parts of diacetone alcohol
2.8 parts of Depanol I
2.49 parts of Solvent Naphtha, 1e 100 parts of white paint The pigment of Comparative Example 1 was used as color strength standard.

The results are summarized in Table 1 below:

| | Transparency | Color strength | L* | a* | b* | C | h |
|---|---|---|---|---|---|---|---|
| Comparative Example 1 | Standard | 100% | 92.6 | −3.7 | 50.1 | 50.3 | 94.3 |
| Example 1 +VI | | 114% | 92.7 | −4.9 | 57.4 | 57.6 | 94.8 |
| Example 2 +II | | 118% | 93.0 | −5.0 | 52.7 | 53.0 | 95.5 |
| Example 3 +VI | | 125% | 92.8 | −4.4 | 55.4 | 55.6 | 94.5 |
| Example 4 +VI | | 122% | 92.8 | −5.2 | 53.3 | 53.6 | 95.6 |
| Example 5 /=/ | | 115% | 92.9 | −4.6 | 54.6 | 54.7 | 94.6 |

The pigment preparations of the present invention are notable for a very high color strength, a light-colored and greener hue and in particular for a significantly higher purity compared with the pigment obtained in Comparative Example 1. The inventive pigment preparations of Examples 1, 3 and 4 also have a significantly higher transparency compared with Comparative Example 1.

Testing of coloristic properties of pigment preparations in an aqueous base varnish system:

Determination of color strength and of CIELAB values:

To determine color strength and CIELAB values, in each case 1 part of the pigment preparation is mixed with 9 parts of an aqueous base varnish system and subsequently dispersed to form a grind mix. For white reduction, in each case 2 parts of this grind mix are homogenized with 100 parts of a standard white dispersion (Weissdispersionsfarbe 236/14E, Esser) and drawn down on a test card. Subsequently, the. coloristic properties (color strength and CIELAB values L*, a*, b*, C and h) are determined using a CM-3700d spectrophotometer from Minolta.

The aqueous base varnish system has the following composition:

56.54 parts of ethylene glycol
19.83 parts of ion-free water
7.46 parts of ® Igepal CO-630
12.67 parts of ® Geropon WS-251
3.2 parts of ® Tamol 731A
0.3 part of Byk-019 Defoamer 100 parts of aqueous base varnish system Determination of transparency:

To determine transparency, in each case 4 parts of the grind mix are homogenized with 9 parts of distilled water and 7 parts of an acrylate varnish (®Viacryl SC 175 W/40)

and drawn down on a test card. The pigment of Comparative Example 1 was used as color strength and transparency standard. Transparency was evaluated similarly to that of the alkyd-melamine baking finish.

The results are summarized in Table 2 below:

|  | Transparency | Color strength | L* | a* | b* | C | h |
|---|---|---|---|---|---|---|---|
| Comparative Example 1 | Standard | 100% | 93.8 | −5.9 | 31.1 | 31.7 | 100.7 |
| Example 1 | +V | 159% | 93.7 | −7.1 | 37.2 | 37.9 | 100.9 |
| Example 2 | +V | 173% | 93.8 | −7.2 | 37.1 | 37.8 | 101.0 |
| Example 3 | +V | 171% | 93.8 | −6.9 | 38.4 | 39.1 | 100.2 |
| Example 4 | +V | 152% | 93.9 | −7.3 | 34.1 | 35.0 | 102.1 |
| Example 5 | +IV | 128% | 93.8 | −6.7 | 34.4 | 35.0 | 101.0 |

The inventive pigment preparations are notable for a very high color strength, a significantly higher purity and a distinctly to substantially higher transparency compared with the pigment obtained in Comparative Example 1.

Production of colorant formulations:

The pigment preparation, either as a powder or as a press cake, is pasted up in deionized water together with the aforementioned dispersants, the organic solvent and the other additives and then homogenized and predispersed using a dissolver. Subsequent fine dispersion is effected using a bead mill over a period of 3 hours with cooling. Subsequently, the dispersion is adjusted with deionized water to the desired pigment end concentration.

The colorant formulations described in the examples which follow were produced by the method described above, using the following constituents in the stated amounts such that 100 parts of the respective colorant formulation are formed, parts being by weight:

COMPARATIVE EXAMPLE A 20 parts of pigment of the formula (I), produced according to Comparative Example 1

```
2.5 parts of acrylate resin, sodium salt (dispersant)
1.2 parts of polyethylene glycol alkyl ether, sodium salt (dispersant)
7.5 parts of propylene glycol
0.2 part of preservative
Balance   water
```

EXAMPLE A

The colorant formulation was produced similarly to Comparative Example A using the inventive pigment preparation of Example 1 instead of the pigment of formula (I) produced according to Comparative Example 1.

EXAMPLE B

The colorant formulation was produced similarly to Comparative Example A using the inventive pigment preparation of Example 3 instead of the pigment of formula (I) produced according to Comparative Example 1.

EXAMPLE C

The colorant formulation was produced similarly to Comparative Example A using the inventive pigment preparation of Example 5 instead of the pigment of formula (I) produced according to Comparative Example 1.

Testing of physical properties of colorant formulations:

Colorant formulations suitable for ink jet printing have to meet a whole series of physical properties, in that for example the median particle size $D_{50}$ should not exceed a value of 150 nm and preferably 100 nm, and the particle size distribution should be as narrow as possible. The particle sizes $D_{25}$, $D_{50}$ and $D_{75}$ of the colorant formulations of Examples A to C and of Comparative Example A were determined using the capillary hydrodynamic fractionation (CHDF) method.

The results are summarized in Table 3 below:

|  | $D_{25}$ [nm] | $D_{50}$ [nm] | $D_{75}$ [nm] |
|---|---|---|---|
| Comparative Example A | 105 | 195 | 291 |
| Example A | 51 | 81 | 125 |
| Example B | 46 | 67 | 104 |
| Example C | 56 | 103 | 174 |

The colorant formulations of Examples A to C, which are produced from the pigment preparations of the present invention, have distinctly smaller particle sizes compared with the colorant formulation of Comparative Example A.

Testing of printing properties of colorant formulations:

Evaluation of printing properties:

To evaluate printing properties, test inks were prepared from the colorant formulations of Examples A to C and of Comparative Example A and tested for their printability using a thermal ink jet printer.

To prepare the test inks, the colorant formulations were initially filtered through a 1 μm filter to remove grinding media attritus and any coarse fractions. Thereafter, the filtered colorant formulations were diluted with water and admixed with further low molecular weight alcohols and polyols to adjust the pigment content to 5% by weight, based on the ink (100% by weight).

Evaluation of physical properties of test inks:

Ink jet printing inks should have a whole series of physical properties. For example, particle sizes should be as small as possible ($D_{50}$ preferably being <100 nm for many systems) coupled with a narrow particle size distribution to prevent cloggage of the nozzles and obtain ink jet prints of high transparency and brilliance. The inks moreover should have a very low viscosity (preferably <5 mPas), which does not significantly change on storage at a temperature higher or lower than room temperature.

Viscosity:

Viscosity was determined using a cone-plate viscometer (Roto Visco 1) from Haake (titanium cone: Ø60 mm, 1°) by examining the dependence of the viscosity on the shear rate in a range between 0 and 700 $s^{-1}$. The viscosity values reported in Table 4 were measured at a shear rate of 400 $s^{-1}$. To evaluate the storage stability of the test inks, the viscosity was measured (1) directly after the preparation of the test ink, (2) after one week's storage at 60° C. and (3) after four weeks' storage at 60° C.

Particle sizes $D_{25}$, $D_{50}$ and $D_{75}$ of test inks were measured similarly to the colorant formulations.

The results are summarized in Table 4 below:

|  | Viscosity [mPas] | | | $D_{25}$ [nm] | $D_{50}$ [nm] | $D_{75}$ [nm] |
|---|---|---|---|---|---|---|
|  | fresh | 7 days/ 60° C. | 28 days/ 60° C. | | | |
| Comparative Example A test ink | 5.2 | 43.0 | solid | 91 | 175 | 255 |
| Example A test ink | 4.5 | 3.8 | 3.6 | 51 | 77 | 125 |
| Example B test ink | 4.1 | 3.7 | 3.7 | 51 | 81 | 132 |
| Example C test ink | 4.5 | 4.0 | 4.3 | 57 | 95 | 161 |

A Canon i560 printer was used to print test images on commercially available standard papers (copy papers) and specialty papers (premium quality). Image quality was assessed by visual inspection.

Gloss measurement:

Gloss was measured by printing the test inks on Epson premium glossy paper in a whole area print using a Canon i560 printer, and gloss was measured with a Byk Gardner gloss meter at an angle of 20° and 60°.

The results are summarized in Table 5 below:

|  | Gloss 20° | Gloss 60° |
|---|---|---|
| Comparative Example A test ink | 40 | 72 |
| Example A test ink | 93 | 110 |
| Example B test ink | 96 | 115 |
| Example C test ink | 80 | 114 |

The test inks prepared from the inventive colorant formulations of Examples A to C have small particle sizes $D_{50}$<100 nm, a low viscosity <5 mPas and exhibit very good printing performance. Particular results are a high reliability on the part of the particular test ink in the printing process (very good start-of-print behavior, no nozzle cloggage) and a very uniform printed image of excellent quality on the various papers used. Prints produced on plain paper with the test inks prepared from the inventive colorant formulations of Examples A to C exhibit a high optical density compared with the test ink of Comparative Example A, and a very high gloss on premium glossy paper.

The test inks prepared from the inventive colorant formulations of Examples A to C thus meet the ink jet printing requirements in an outstanding manner.

What is claimed is:

1. A pigment preparation based on C.I. Pigment Yellow 155, comprising C.I. Pigment Yellow 155 and 0.1% to 50% by weight, based on the weight of C.I. Pigment Yellow 155, of at least one pigment dispersant selected from the group consisting of monoazo and disazo pigments, wherein the at least one pigment dispersant is substituted with at least one sulfonic acid group, wherein the pigment preparation has a chroma C greater than 35 in the CIELAB system in an aqueous base varnish system in a white reduction comprising a 0.2% by weight concentration of the pigment preparation in white reduction.

2. A pigment preparation according to claim 1, comprising 0.5% to 20% by weight of the at least one pigment dispersant.

3. A pigment preparation according to claim 1 wherein the pigment preparation has a chroma C greater than 36 in the aqueous base varnish system in white reduction.

4. A pigment preparation according to claim 1 wherein the at least one pigment dispersant has chroma C greater than 37 in the aqueous base varnish system in white reduction.

5. A pigment preparation according to claim 1, wherein the at least one pigment dispersant is a compound of the formula (II)

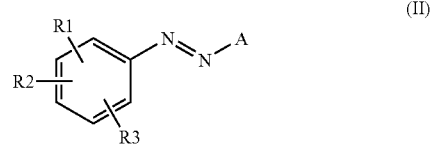

where A is a radical of the formula (III) or (IV)

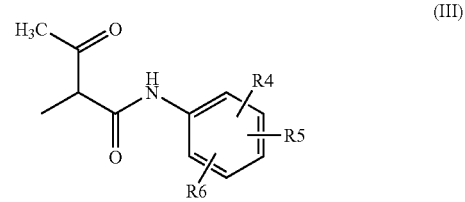

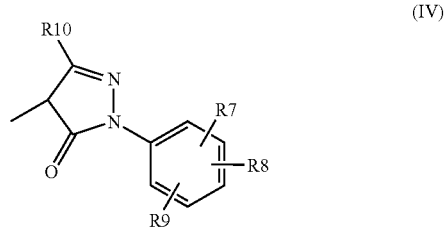

and wherein

R1, R2, R3, R4, R5, R6, R7, R8 and R9 are independently H, halogen, SQ3M, a substituted or unsubstituted, branched or unbranched $C_1$-$C_{10}$-alkyl or $C_3$-$C_{10}$-cycloalkyl radical, a substituted or unsubstituted, branched or unbranched $C_2$-$C_{10}$-alkenyl or $C_3$-$C_{10}$-cycloalkenyl radical, aryl, aryloxy, aryl($C_1$-$C_4$)alkyl, hetaryl, hetaryloxy, hetaryl($C_1$-$C_4$)alkyl or $C_1$-$C_{10}$-alkoxy, R10 is H, COOM, COO($C_1$-$C_{10}$)alkyl, a substituted or unsubstituted, branched or unbranched $C_1$-$C_{10}$-alkyl or $C_3$-$C_{10}$-cycloalkyl radical, and M is H, a univalent metal cation, the equivalent of a multivalent cation, $NH_4^+$, a secondary, tertiary or quaternary ammonium ion, with the proviso that at least one of the two phenyl rings is substituted with at least one sulfonic acid group.

6. A pigment preparation according claim 1, wherein the at least one pigment dispersant is a compound of the formula (V)

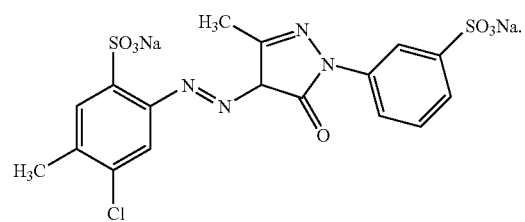

7. A pigment preparation according to claim 1 wherein the at least one pigment dispersant is a compound of the formula (VI)

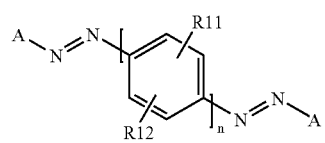

where A is a radical of the formula (III) or (IV)

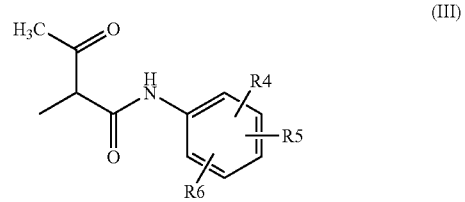

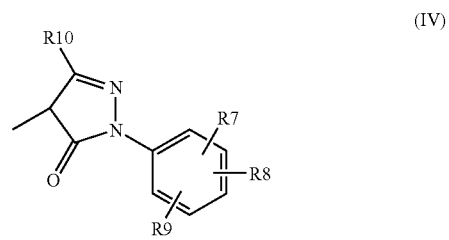

and

R11 and R12 are independently

H, halogen, a substituted or unsubstituted, branched or unbranched $C_1$-$C_{10}$-alkyl or $C_3$-$C_{10}$-cycloalkyl radical, a substituted or unsubstituted, branched or unbranched $C_2$-$C_{10}$-alkenyl or $C_3$-$C_{10}$-cycloalkenyl radical or $C_1C_{10}$-alkoxy, and n is 1 or 2, with the proviso that at least one of the two terminal phenyl rings in the A radical is substituted with at least one sulfonic acid group.

8. A pigment preparation according to claim 1, wherein the at least one pigment dispersant is a compound of the formula (VII)

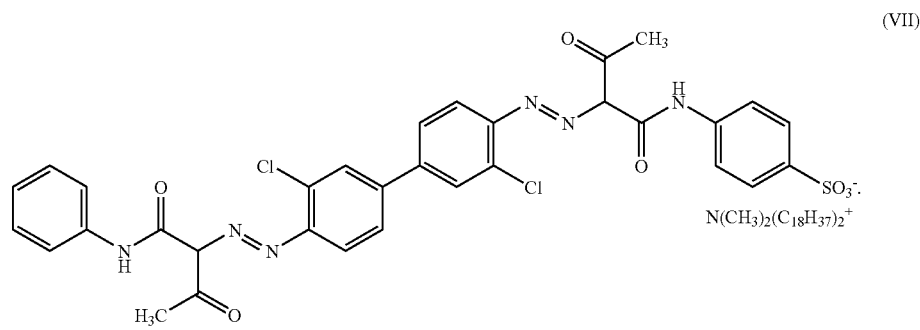

9. A pigment preparation according to claim 7, wherein n is 2.

10. A process for pigmenting a macromolecular organic material comprising the step of adding a pigment preparation according to claim 1 to the macromolecular organic material during manufacture of the macromolecular organic material.

11. The process according to claim 10, wherein the macromolecular organic material is selected from the group consisting of plastics, resins, coatings, paints, electrophotographic toners, electrophotographic developers, electret materials, color filters, liquid inks, printing inks and seed.

12. The process according to claim 11, wherein the liquid ink is an ink jet ink.

13. A macromolecular organic material made in accordance with the process of claim 10.

14. A macromolecular organic material made in accordance with the process of claim 11.

15. A process for producing a pigment preparation comprising C.I. Pigment Yellow 155 and 0.1% to 50% by weight, based on the weight of C.I. Pigment Yellow 155, of at least one pigment dispersant selected from the group consisting of monoazo and disazo pigments, wherein the at least one pigment dispersant is substituted with at least one sulfonic acid group, wherein the pigment preparation has of a chroma C greater than 35 in the CIELAB system in an aqueous base varnish system in a white reduction comprising a 0.2% by weight concentration of the pigment preparation in white reduction said process comprising the step of heating a PY 155 crude pigment in a mixture of water and an organic solvent having a boiling point of above 100° C., at an alkaline pH, and in the presence of 0.1% to 50% by weight, based on the weight of C.I. Pigment Yellow 155, of the pigment dispersant to a temperature of above 60° C.

16. A process according to claim 15, wherein the organic solvent is an aromatic solvent.

17. A process according to claim 15, wherein the organic solvent is selected from the group consisting of chlorobenzene, bromobenzene, dichlorobenzenes and trichlorobenzenes.

18. A process according to claim 15, wherein the heating is to a temperature of above 90° C.

19. A process according to claim 15, wherein the pH is not less than 9.

* * * * *